United States Patent
Breau et al.

(10) Patent No.: US 8,358,648 B1
(45) Date of Patent: Jan. 22, 2013

(54) ALLOCATING SOCKET RANGES TO INCREASE ADDRESS SPACE

(75) Inventors: Jeremy R. Breau, Kansas City, MO (US); John H. Bennett, III, Lawrence, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 504 days.

(21) Appl. No.: 12/634,299

(22) Filed: Dec. 9, 2009

Related U.S. Application Data

(63) Continuation-in-part of application No. 12/433,483, filed on Apr. 30, 2009, which is a continuation-in-part of application No. 12/400,588, filed on Mar. 9, 2009.

(51) Int. Cl.
```
H04L 12/66    (2006.01)
H04L 12/28    (2006.01)
H04L 12/16    (2006.01)
G06F 15/16    (2006.01)
```
(52) U.S. Cl. ......... 370/352; 370/389; 370/260; 709/203
(58) Field of Classification Search ............ 370/352, 370/401, 400, 468, 419, 389, 392, 396, 328, 370/329, 321, 335; 709/220–226
See application file for complete search history.

(56) References Cited

U.S. PATENT DOCUMENTS
7,031,275 B1 *  4/2006  Borella et al. .............. 370/328
7,471,684 B2 * 12/2008  Finley et al. ................ 370/392

OTHER PUBLICATIONS
U.S. Appl. No. 12/433,483, filed Apr. 30, 2009, "Socket-Based Internet Protocol for Wired Networks".
U.S. Appl. No. 12/400,588, filed Mar. 9, 2009, "Socket-Based Internet Protocol for Wireless Networks".

* cited by examiner

*Primary Examiner* — Hanh Nguyen

(57) ABSTRACT

Computer systems and computerized methods for assigning network identifiers in a wireless or wired network are provided. A dynamic host configuration protocol (DHCP) server is employed to allocate a set of socket IP addresses that include a common IPv4 address paired with a selected group of ports, where none of the ports in the selected groups overlap. When assigned to a client device, a socket IP address that includes the IPv4 address together with a particular group of ports uniquely identifies the client device within the network. The particular group of ports is selected as a function of network traffic, a set of functional capabilities exhibited by the client device, or both. The network traffic is measured dynamically, periodically, or at some earlier time. The functional capabilities are conveyed from the client device or accessed at a user profile that is readable by the DHCP server.

19 Claims, 5 Drawing Sheets

ALLOCATING SOCKET RANGES TO INCREASE ADDRESS SPACE

CROSS-REFERENCE TO RELATED APPLICATIONS

This application is a continuation-in-part of prior U.S. application Ser. No. 12/433,483 filed on Apr. 30, 2009, entitled "SOCKET-BASED INTERNET PROTOCOL FOR WIRED NETWORKS," which is a continuation-in-part of prior U.S. application Ser. No. 12/400,588 filed Mar. 9, 2009, entitled "SOCKET-BASED INTERNET PROTOCOL FOR WIRELESS NETWORKS." The teachings of U.S. application Ser. No. 12/433,483 and U.S. application Ser. No. 12/400,588 are hereby incorporated by reference in their entirety.

BACKGROUND

Communication among computing devices typically occurs through networks. For computing devices in a wireless or wired network to communicate, each device must have a unique network identifier. In packet-switched networks, each network device is assigned an internet protocol (IP) address to identify the particular device in the network.

The dominant standard for IP addresses is internet protocol version four (IPv4). IPv4 addresses are 32 bits in length, which limits the possible number of IPv4 addresses available for use to 4,294,967,296 ($2^{32}$). As the number of client devices seeking network connections continues to grow, the number of available IPv4 addresses continues to decline and will eventually reach zero. This problem is known as IPv4 address exhaustion. Although estimates of the approximate date of IPv4 address exhaustion vary, it is widely recognized that IPv4 addresses will eventually be exhausted.

SUMMARY

Embodiments of the present invention relate to systems and methods for assigning unique network identifiers in a wired or wireless network. The systems and methods facilitate assigning a unique network identifier, which includes an IPv4 address and sockets or ports, to a client device that is active on the network. Utilizing this socket-based, unique network identifier allows for the assignment of many unique network identifiers to multiple client devices that are active on the same network and that use the same IPv4 address. Because each unique network identifier includes a group of ports in addition to the IPv4 address, the usefulness of a single IPv4 address is extended from one client device to multiple client devices.

In one embodiment, the selected group of ports pertain to a range of ports allocated to a specific client device from a group of available ports. The group of available ports includes those ports associated with the single IPv4 address that are not pre-designated or reserved for supporting common operations (e.g., port 21 for FTP, port 25 for SMTP, and port 80 for HTTP), or already allocated to other client devices in the network. In one instance, a size of the range of ports, or a number of ports within the selected group, allocated to the specific client device is adjusted as a function of network traffic. The "network traffic" may generally represent a load on the network over a particular window of time averaged across multiple days, or snapshot of time. By way of example, the load on the network during a particular window of time may be a tracked number of network connections that are made between the hours of 4:00 pm and 6:00 pm.

In one instance, the size of the range of ports, or the number of ports within the selected group, allocated to the specific client device is adjusted as a function of a set of functional capabilities that are exhibited by the client device. In embodiments, these functional capabilities may be communicated from the client device when it is requesting a network identifier, or may be accessed at a user profile that includes specifications of the client device. Typically, the higher the number of functional capabilities, or the more complex the type of functional capabilities, the larger the size of the port range, or the greater the amount of ports in the group, that is allocated to the client device by a server or a router.

Once the range of ports is selected and allocated to the client device, the port range, in conjunction with the IPv4 address, may be stored in an address resolution protocol (ARP) cache and may be used to aid the routing of data packets across the network. Generally, the client device is responsible for incorporating the IP address and the range of ports allocated thereto into a header of a data packet and for transmitting the data packet over the network. Upon reaching the server or the router, the header may be read, and the IP address together with the range of ports may be used to identify the client device as the sender and/or to determine the identity of a destination of the data packet.

In another embodiment, a computer system is provided that includes a server (e.g., dynamic host configuration protocol (DHCP) server) that hosts a functional-capabilities component for adjusting a size of a port range as a function of functional capabilities and a network-traffic component for adjusting the size of the port range as a function of network traffic. These components may be used in tandem or individually to assign client devices identifiers that are unique within the network. As described above, the assigned network identifiers are created such that multiple client devices that are active on the network may be assigned network identifiers, which are distinct from each other, while using a common IPv4 address. In an exemplary embodiment, the DHCP server has logic installed thereon that invokes the components to allocate a range of ports, from a listing of available ports, by inspecting the functional capabilities of the requesting client device and/or by measuring the amount of traffic on the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Figure 1:
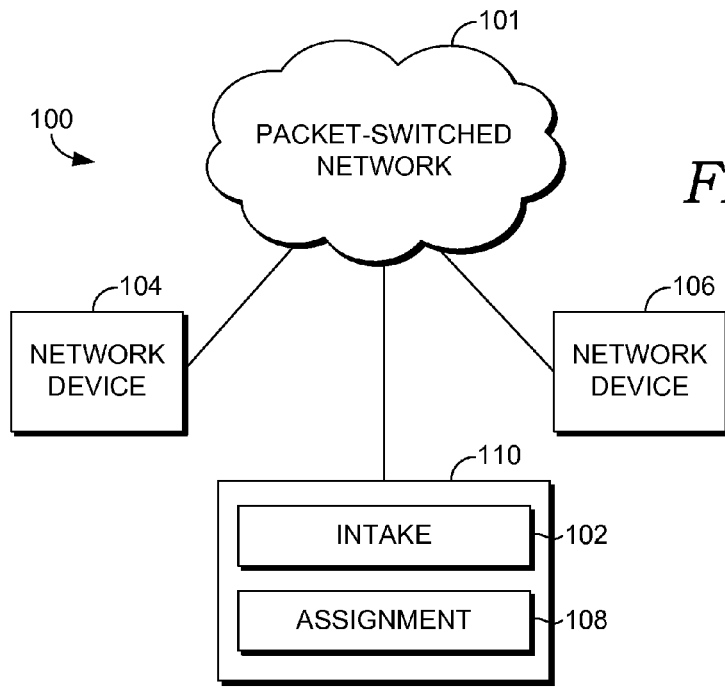
FIG. 1 is a block diagram of a unique network identifier assignment system according to an embodiment of the present invention.

Embodiments of the present invention are described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems and methods for assigning unique network identifiers in a packet-switched wired network as well as in a wireless network. Within one or more of these networks, information is divided into packets and routed to a destination. In some instances, internet protocol (IP) is the packet-switching protocol, which enables delivery of packets from a source device to a destination device. In order for a data packet to successfully complete the journey from source to destination, each source and destination device must have a unique network identifier. Currently, each network device in a packet-switched wired network or a wireless network is assigned an IP address as a unique network identifier. IP addresses can be assigned manually or through dynamic host configuration protocol (DHCP) or other protocols or methods.

In wireless networks or in packet-switched wired networks using DHCP, a DHCP server receives requests for IP addresses and assigns IP addresses. When a DHCP server responds to a client request for an IP address by assigning the client an IP address, a router in the network sees the assignment and stores which IP address is assigned to which physical network device. In networks using address resolution protocol (ARP), the router stores the IP address in association with the network device's media access control (MAC) address. When future packets arrive at the router, the router will perform a lookup by destination IP address to determine to which MAC address the packet should be routed.

As discussed above, the dominant standard for IP addresses is IPv4. Internet protocol version six (IPv6) has been developed as an alternative to IPv4, but IPv6 has not been widely adopted. While IPv6 would provide 128-bit addressing (providing $2^{128}$ possible addresses) and virtually eliminate the concern of IPv4 address exhaustion, implementation of IPv6 requires a significant software and hardware investment.

When an IP address is assigned to a single network device, thousands of ports are often left unused. Each IP address has 65,536 ($2^{16}$) ports. Some ports are typically assigned specific functions. For example, port 80 is typically assigned to hypertext transfer protocol (HTTP) communication. Ports typically assigned to specific functions and ports actually used by the device to which an IP address is assigned only constitute a small percentage of the available ports, leaving potentially thousands of ports unused. The systems and methods described herein make use of these currently unused ports and allow one IP address to be assigned to potentially thousands of network devices, thus providing an immediate, cost-effective solution to IPv4 exhaustion.

Embodiments of the invention relate to assigning a unique network identifier, including an IP address and one or more ports, to a network device in a wireless or packet-switched wired network. The combination of an IP address and a port is known as a socket and can be written as "IP_address:port." For example, the socket consisting of IP address 192.168.1.1 and port 1200 is written "192.168.1.1:1200." A second socket-based unique identifier can then be assigned to a second network device using the same IP address and one or more different ports that were not assigned to the first network device. For example, 192.168.1.1:1200-1299 may be assigned to a first network device, and 192.168.1.1:1300-1399 may be assigned to a second network device. Additional unique network identifiers may be created by combining IP address 192.168.1.1 and other port groupings. These additional unique network identifiers may be assigned to additional network devices.

FIG. 1 illustrates a unique network identifier assignment system 100 for a wireless or packet-switched wired network 101. In packet-switched network 101, which could be the Internet, a local area network (LAN), wide area network (WAN), or other packet-switched network, an intake component 102 receives requests to assign a unique network identifier to a network device, such as network device 104 and network device 106. The request could originate from network device 104 or from a router, server, network manager, or other network entity. Network device 104 may be a personal computer, computer workstation, printer, or other device physically connected to packet-switched network 101. In one embodiment, intake component 102 is a server or other computing device with software functionality to receive and forward requests for unique network identifiers. In alternate embodiments, the functionality of intake component 102 is distributed across multiple computing devices. In still other embodiments, intake component 102 is a functional component of a single server or computing device such as a server 110, which may be a DHCP server.

An assignment component 108 identifies an unassigned unique network identifier and assigns the unassigned unique network identifier to the requesting network device, such as network device 104 or network device 106. In one embodiment, assignment component 108 is a server or other computing device with software functionality to identify and assign unique network identifiers. In other embodiments, the functionality of assignment component 108 is distributed across multiple computing devices. In still other embodiments, assignment component 108 and intake component 102 are functional components of a single server or computing device, such as server 110, which may be a DHCP server. Assignment component 108 may also be the network manager.

The unique network identifier identified and assigned by assignment component 108 includes an IP address and one or more of that IP address's 65,536 ports. In one embodiment, the unused ports for a particular IP address are grouped before assignment, such that a list of unique network identifiers is created for one IP address, each identifier including the IP address and one or more ports. In certain embodiments, the unused ports of a particular IP address are organized into groupings of a number of ports predetermined to be generally sufficient for network devices—for example, 100 ports per grouping. The ports contained in each grouping may be continuous or non-continuous. According to these embodiments, when a request for a unique network identifier is received, assignment component 108 selects a unique network identifier from the list.

Embodiments of the invention present assignment component 108 with multiple IP addresses available to assign. In such embodiments, each IP address is divided into multiple unique network identifiers as described above. Assignment component 108 assigns a requesting network device any of the unassigned unique network identifiers. For example, assignment component 108 assigns IP address 1.2.3.4, combined with ports 220-319, to address-requesting network device 104. Assignment component 108 might then assign IP address 1.2.3.4, combined with a different port grouping, such as 320-419, to address-requesting network device 106. Alternatively, assignment component 108 assigns a different IP address, such as 9.8.7.6, combined with a port grouping to address-requesting network device 106. Although FIG. 1 indicates only two network devices for simplicity, any number of network devices is contemplated. No particular order need be followed in assigning unique network identifiers to network devices. That is, all unique network identifiers created from one particular IP address do not need to be assigned before unique network identifiers created from a different IP address are assigned.

Different network devices may require different numbers of total ports. In such embodiments, assignment component 108 evaluates what type of network device is requesting a unique network identifier, or whether the requesting network device has specific functions or requirements, including the device's bandwidth needs, and dynamically groups unused ports to form a unique network identifier with an appropriate number of ports. In another embodiment, an IP address's unused ports are grouped into groupings of different sizes before a request for a unique network identifier is received. In yet another embodiment, the ports are similarly grouped across the IP addresses. As such, the number and identity of the ports in the groups or port ranges are substantially consistent when handed out to the network devices. Depending on the embodiment of the invention, port grouping and creation of unique network identifiers could be performed by assignment component 108 or could be performed external to assignment component 108.

Assignment component 108 assigns a socket-based unique network identifier either automatically or manually. DHCP is the predominant protocol used to automatically assign IP addresses, DNS server addresses, Gateway IPs, and SubNet Masks, although other protocols could be used. As discussed above, in certain embodiments, assignment component 108 is part of a DHCP server. DHCP can be modified to assign a port with an IP address. Packet-switched communication can occur through a variety of transport layer protocols such as transmission control protocol (TCP) or user datagram protocol (UDP). For a network device running the Microsoft® Windows® operating system, a socket-based unique network identifier can be assigned using the commands below. These exemplary commands assign a socket-based unique network identifier created by combining an IP address and ports 34,000-34,999 of that IP address. Commands are presented for both TCP and UDP communication.

netsh int ipv4 set dynamicport tcp start=34000 num=1000 (TCP); or netsh int ipv4 set dynamicport udp start=34000 num=1000 (UDP).

For a network device running the Linux operating system, the same unique network identifier may be manually assigned using the following command:

sysctl −w net.ipv4.ip local port range="34000 35000."

Figure 2:
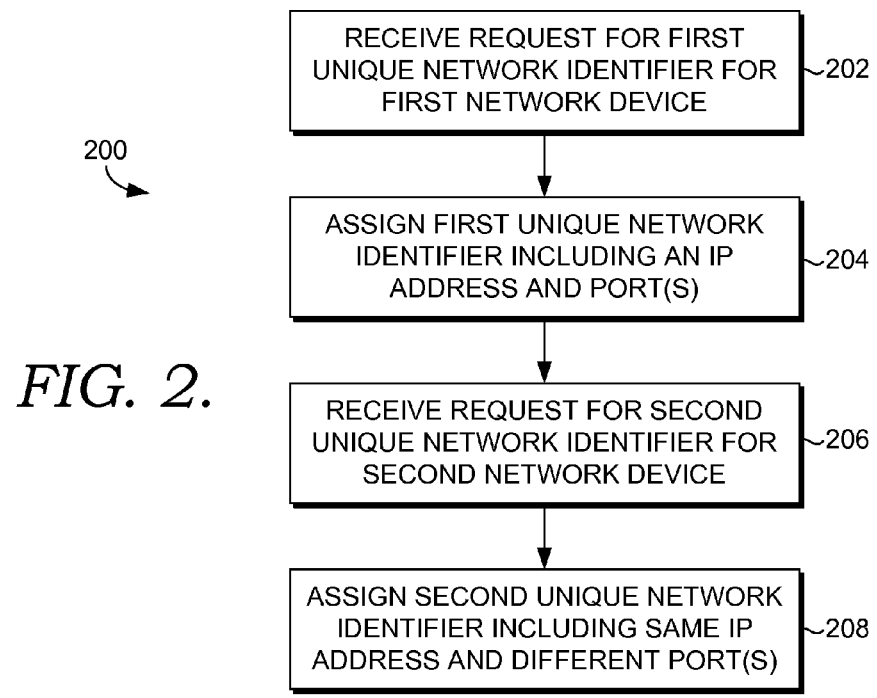
FIG. 2 is a flow chart of an exemplary method for assigning a unique network identifier in a wireless or packet-switched wired network.

FIG. 2 illustrates an exemplary method 200 of assigning a socket-based unique network identifier in a packet-switched wired network or in a wireless network. A request for a first unique network identifier for a first network device is received in step 202. The request could originate from the first network device or from a server, network manager, or other network entity. A first unique network identifier is assigned in step 204. The first unique network identifier includes an IP address and one or more ports, as discussed in detail above. The first unique network identifier can be assigned as described above. A request for a second unique network identifier for a second network device is received in step 206. The request for the second unique network identifier may also be received by the router. As with step 202, the request could come from the second network device or from a server, network manager, or other network entity. A second unique network identifier is assigned in step 208. The second unique network identifier includes the same IP address as the first unique network identifier and one or more ports that are not part of the first unique network identifier. Thus, method 200 allows two unique network identifiers to be assigned using only one IP address. Additional unique network identifiers created from the same IP address may also be assigned in this fashion.

Although communications may occur consistent with various protocols and standards on a wireless or wired, packet-switched network, the TCP/IP suite of protocols is the predominant standard. In TCP/IP implemented networks, a DHCP server typically controls the assignment of IP addresses. When a network device is connected, the device transmits a request for an IP address. The DHCP server receives the request and assigns the network device an IP address. Often, the DHCP server assigns the IP address for a specified time period, known as leasing the IP address to the network device. Various devices in the network may store the IP address assigned to the network device in association with the MAC address of the network device. For instance, those devices that have communicated with the DHCP server, the network device, or an address resolution protocol (ARP) cache can learn and maintain a record of the IP address and the MAC address of the network device. This association is typically stored in an ARP table. When packets are sent to the IP address associated with the network device, the router will perform a lookup in the ARP table and route the packets to the network device having the MAC address associated with the destination IP address.

Figure 3:
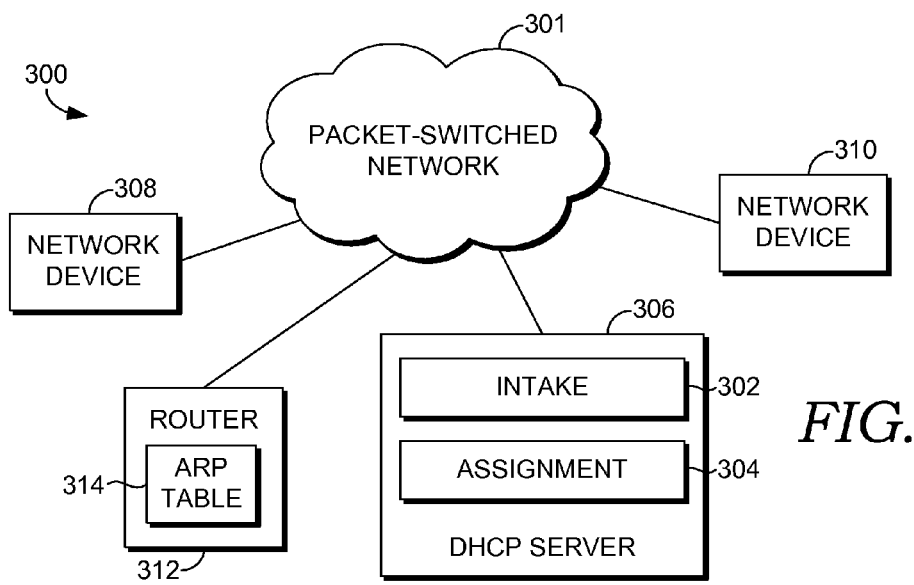
FIG. 3 is a block diagram of a unique network identifier assignment system, according to an embodiment of the present invention, in which a DHCP server assigns unique network identifiers.

FIG. 3 illustrates an embodiment of a unique network identifier assignment system 300 for a packet-switched network 301 that is configured for TCP/IP. In packet-switched network 301, which could be the Internet, a local area network (LAN), wide area network (WAN), or other packet-switched network, an intake component 302 and an assignment component 304 are part of a DHCP server 306. Intake component 302 receives a request to assign a unique network identifier to a network device, such as network device 308 and network device 310. The request could originate from network device 308 or from a server, network manager, or other network entity. Network device 308 may be a personal computer, computer workstation, printer, or other device physically connected to packet-switched network 301. In some embodiments, intake component 302 is a server or other computing device with software functionality to receive and forward requests for unique network identifiers. In other embodiments, the functionality of intake component 302 is distributed across multiple computing devices.

Assignment component 304 of DHCP server 306 identifies an unassigned unique network identifier and assigns the unassigned unique network identifier to the requesting network device, such as network device 308 or network device 310. In certain embodiments, assignment component 304 is a server or other computing device with software functionality to identify and assign unique network identifiers. The functionality of assignment component 304 is distributed across multiple computing devices in other embodiments.

The unique network identifier identified and assigned by assignment component 304 of DHCP server 306 includes an IP address and one or more of that IP address's 65,536 ports. In one embodiment, the total number of unused ports for a particular IP address is divided into groups before assignment, such that a list of unique network identifiers is created for one IP address, with each identifier including the IP address and one or more ports. The groups into which the unused ports of a particular IP address are divided may be a number of ports predetermined to be generally sufficient for network devices—for example, 100 ports per grouping. The ports contained in each grouping may be continuous or non-continuous. When a request for a unique network identifier is received, assignment component 304 of DHCP server 306 then selects an identifier from the list.

In embodiments of the invention, assignment component 304 of DHCP server 306 has multiple IP addresses available to assign. In such embodiments, each IP address is divided into multiple unique network identifiers as described above. Assignment component 304 assigns a requesting network device any of the unassigned unique network identifiers. For example, assignment component 304 could assign IP address 1.2.3.4, combined with ports 220-319, to address-requesting network device 308. Assignment component 304 could then assign IP address 1.2.3.4, combined with a different port grouping, such as 320-419, to address-requesting network device 310. Alternatively, assignment component 304 could assign IP address 9.8.7.6 combined with a port grouping to address-requesting network device 310. Assignment component 304 of DHCP server 306 assigns socket-based unique network identifiers using DHCP. When a unique network identifier is assigned, the unique network identifier and the MAC address of the network device to which it is assigned are captured by a router 312 and stored in an ARP table 314.

Different network devices may require different numbers of total ports. In certain embodiments, assignment component 304 of DHCP server 306 evaluates what type of network device is requesting a unique network identifier, or whether the requesting network device has specific functions or requirements, including the device's bandwidth needs, and dynamically groups unused ports to form a unique network identifier with an appropriate number of ports. In another embodiment, an IP address's unused ports may be grouped into groupings of different sizes before a request for a unique network identifier is received. In yet another embodiment, the ports are similarly grouped across the IP addresses. As such, the number and identity of the ports in the groups or port ranges are substantially consistent when handed out to the network devices. Depending on the embodiment of the invention, port grouping and creation of unique network identifiers may be performed by assignment component 304 or may be performed external to assignment component 304.

Figure 4:
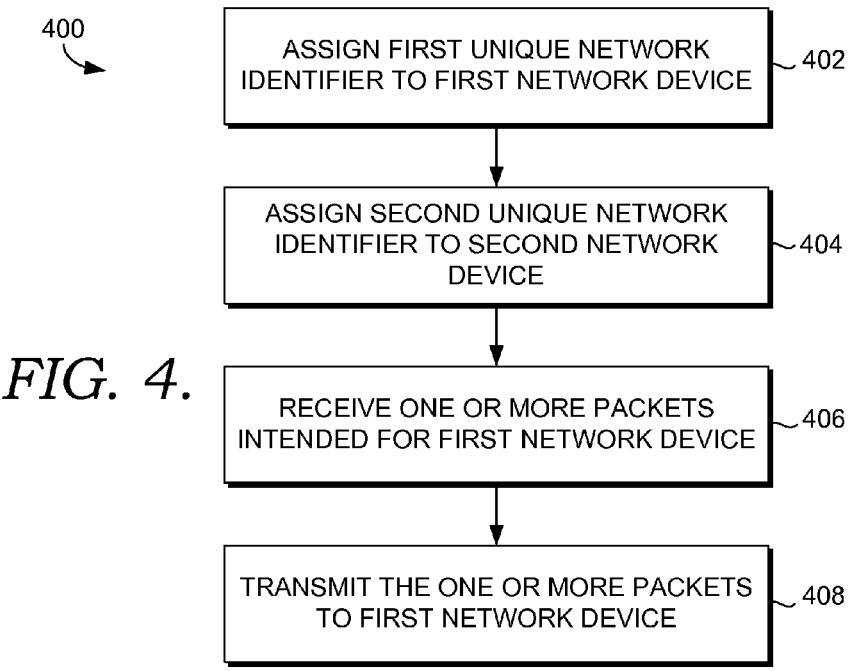
FIG. 4 is a flow chart of an exemplary method for communicating with a network device in a wireless or packet-switched wired network.

FIG. 4 illustrates an exemplary method 400 of communicating with a first network device in a wireless or packet-switched wired network having a plurality of network devices. In step 402, a first network device is assigned a first unique network identifier including an IP address and one or more ports. In step 404, a second network device is assigned a second unique network identifier. The second unique network identifier includes the same IP address assigned to the first network device and one or more different ports that are not assigned to the first network device, as described above. DHCP has been modified to allow assignment of one or more ports along with the IP address.

The first unique network identifier, as well as the MAC address of the network device to which it is assigned, and the second unique network identifier, as well as the MAC address of the network device to which it is assigned, are recorded by a various device in the network, such as a router, and can be used to populate the router's ARP table or an ARP cache. For instance, any devices that have communicated with the DHCP server, the network device, or the ARP cache can learn and maintain a record of the unique network identifiers and the MAC addresses of the network devices. ARP has been modified to allow recordation of both an IP address and one or more ports. One or more packets intended for the first network device are received in step 406. The receiving entity could be a router, server, network manager, or other computing device. Based on the unique network identifier, the one or more packets are transmitted to the first wireless device in step 408.

Figure 5:
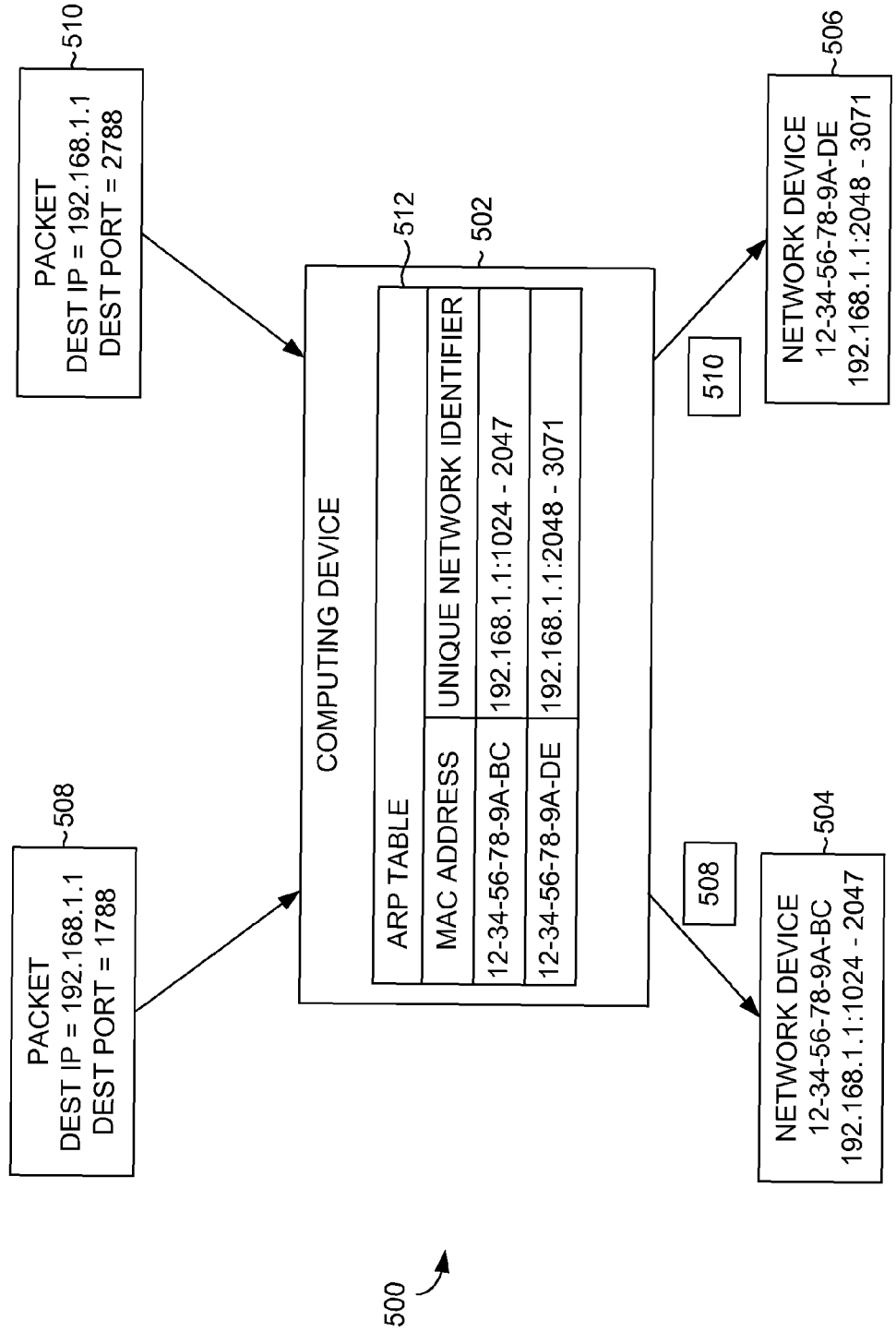
FIG. 5 is a block diagram of a network device communication system according to an embodiment of the present invention.

FIG. 5 further illustrates method 400 of communicating with a network device discussed with reference to FIG. 4 in a TCP/IP configured packet-switched wired network or wireless network. A TCP/IP-configured communication system 500 includes a computing device 502, a network device 504, and a network device 506. When network devices request access to the network, each device is identified by that device's MAC address. Each device's MAC address may be a universally administered address determined by the device manufacturer or a locally administrated address assigned by the network administrator. MAC addresses are 48-bits in length and can be represented in hexadecimal format as XX-XX-XX-XX-XX-XX, where X is one of 0-9 and A-F. Network device 504 is identified by 12-34-56-78-9A-BC, and network device 506 is identified by 12-34-56-78-9A-DE. Network device 504 is assigned IP address 192.168.1.1 and port range 1024-2047. Network device 506 is also assigned IP address 192.168.1.1 but is assigned a different port range—2048-3071. For each network device, the assigned unique network identifier and MAC address pair are recorded in ARP table 512 of computing device 502.

A packet 508 and a packet 510 are received by computing device 502. Packet 508 has a destination IP address of 192.168.1.1 and a destination port of 1788. Packet 510 has a destination IP address of 192.168.1.1 and a destination port of 2788. When packet 508 arrives at computing device 502, computing device 502 compares the destination IP address and destination port of packet 508, which is 192.168.1.1:1788, to the ARP table entries. After accessing the ARP table, computing device 502 determines that network devices with the MAC addresses 12-34-56-78-9A-BC and 12-34-56-78-9A-DE are associated with IP address 192.168.1.1. The router then locates the MAC address of the device whose unique network identifier port range includes the destination port 1788. Network device 504 (MAC address 12-34-56-78-9A-BC) has been assigned port range 1024-2047, so packet 510 is routed to network device 504.

Similarly, packet 510 is received by computing device 502. Computing device 502 compares the destination IP address and destination port of packet 510, which is 192.168.1.1:2788, to the ARP table entries. After accessing the ARP table, computing device 502 determines that network devices with the MAC addresses 12-34-56-78-9A-BC and 12-34-56-78-

9A-DE are associated with IP address 192.168.1.1. The router then locates the MAC address of the device whose unique network identifier port range includes the destination port 2788. Network device 506 (MAC address 12-34-56-78-9A-DE) has been assigned port range 2048-3071, so packet 508 is routed to network device 506.

Figure 6:
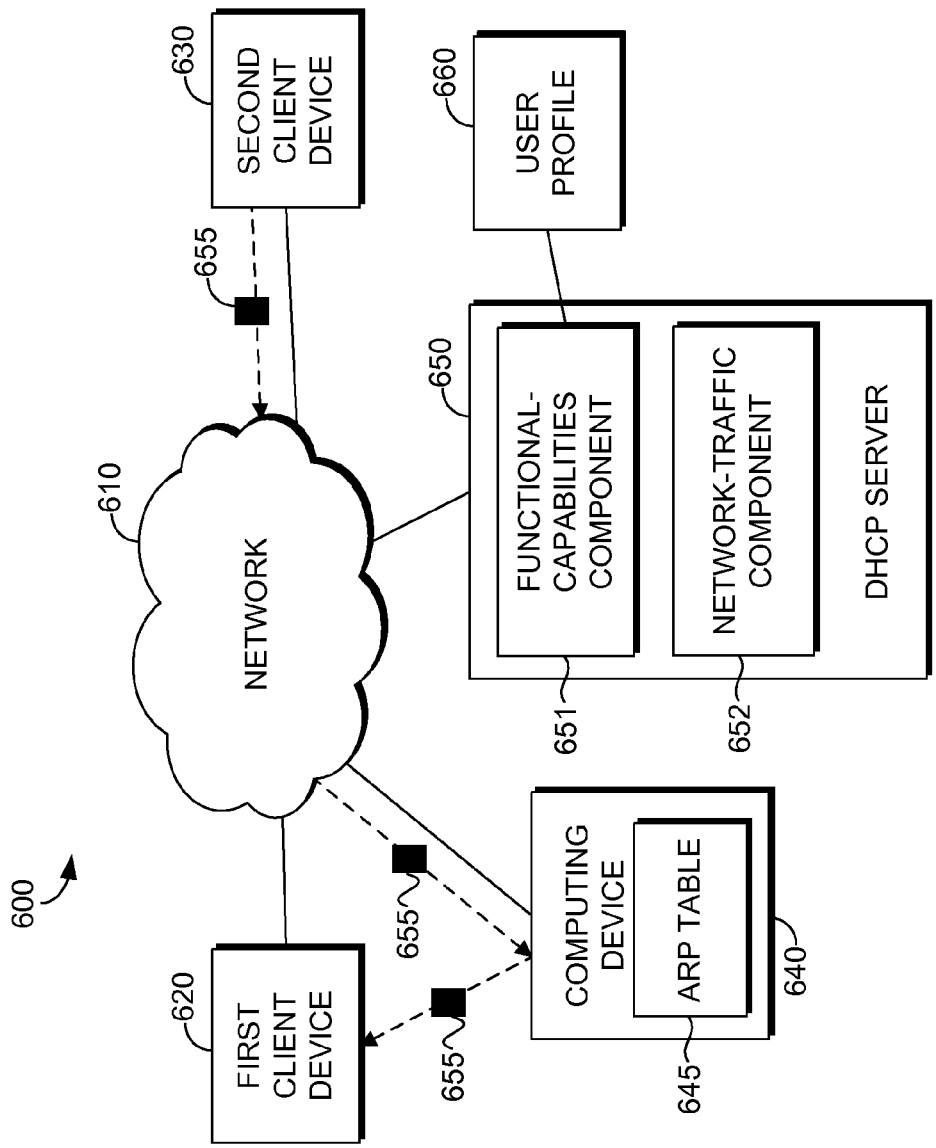
FIG. 6 is a block diagram illustrating an exemplary system architecture suitable for use in implementing embodiments of the present invention.

Turning now to FIG. 6, a block diagram illustrating an exemplary system architecture 600 suitable for use in implementing embodiments of the present invention is shown. In embodiments, the system architecture 600 is generally configured to assign network identifiers to client devices 620 and 630, and others, that are active in a network 610. As depicted, the system architecture 600 includes the client devices 620 and 630, a computing device 640, a DHCP server 650 that hosts a functional-capabilities component 651 and a network-traffic component 652, and a user profile 660.

This exemplary system architecture 600 is but one example of a suitable environment that may be implemented to carry out aspects of the present invention, and is not intended to suggest any limitation as to the scope of use or functionality of the invention. Neither should the illustrated exemplary system architecture 600 be interpreted as having any dependency or requirement relating to any one or combination of the components 651 and 652 as illustrated. In some embodiments, one or more of the components 651 and 652 may be implemented as stand-alone devices. In other embodiments, one or more of the components 651 and 652 may be integrated directly into the computing device 640 or the client devices 620 and 630. It will be understood by those of ordinary skill in the art that the components 651 and 652 illustrated in FIG. 6 are exemplary in nature and in number and should not be construed as limiting.

Accordingly, any number of components may be employed to achieve the desired functionality within the scope of embodiments of the present invention. Although the various components of FIG. 6 are shown with lines for the sake of clarity, in reality, delineating various components is not so clear, and metaphorically, the lines would more accurately be grey or fuzzy. Further, although some features of FIG. 6 are depicted as single blocks, the depictions are exemplary in nature and in number and are not to be construed as limiting (e.g., although only two client devices 620 and 630 are shown, many more may be communicatively coupled to the DHCP server 650).

In embodiments, the DHCP server 650 is generally configured to allocate a first socket IP address (including an IPv4 address and a first range of ports), to allocate a second socket IP address (including the IPv4 address and a second range of ports), and to assign the first socket IP address to the first client device 620 and the second socket IP address to the second client device 630. Typically, an ARP table 645 stores, at least temporarily, the assigned first socket IP address in association with the first client device 620 and the assigned second socket IP address in association with the second client device 630. In embodiments, the computing device 640 can access and read the ARP table 645 upon receiving a data packet, compare a socket IP address in a header of the data packet with entries in the ARP table 645, and direct transmission of the data packet within the network 610 based on the socket IP address.

The DHCP server 650 and the computing device 640, in embodiments, may take the form of various types of computing devices, such as, for example, a personal computer, desktop computer, laptop computer, wireless device, consumer electronic device, handheld device (e.g., personal digital assistant), various servers, a computing cloud, and the like. It should be noted, however, that the invention is not limited to implementation on such computing devices, but may be implemented on any of a variety of different types of computing devices within the scope of embodiments of the present invention.

Further, the DHCP server 650 and the computing device 640, in embodiments, may include memory that is linked to some form of a computing unit (e.g., central processing unit, microprocessor, etc.) to support operations of the components running thereon (e.g., functional-capabilities component 651 or network-traffic component 652). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the DHCP server 650 and the computing device 640 in order to enable each device to perform communication-related processes and other operations (e.g., allocating a range of ports based on one or more criteria). In another instance, the computing unit may encompass a processor (not shown) coupled to computer-readable media.

Generally, the computer-readable media stores, at least temporarily, a plurality of computer software components, including the components 651 and 652, that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Returning to FIG. 6, the first client device 620 and the second client device 630 represent two devices, of potentially millions of devices, that may be actively communicating with each other across the network 610. By way of example only and not limitation, the client devices 620 and 630 may be a handheld wired or wireless device (e.g., personal digital assistant, cell phone, GPS device, and the like), a computing device (e.g., personal computer, desktop computer, laptop computer, server, and the like), a consumer electronic device, and other devices that are capable of communicating over the network 610. It should be noted, however, that the invention is not limited to implementation on such computing devices, but may be implemented on any of a variety of different types of computing devices within the scope of embodiments of the present invention.

In an exemplary embodiment of operation, the first client device 620 may become active on the network 610. In some instances, becoming active involves powering up and achieving connectivity with the network 610. Upon becoming active, the first client device 620 may query the DHCP server 650 with a request to provide a network identifier that is unique within the context of the network 610, thereby allowing the computing device 640 to identify data packets originating from the first client device 620 or being sent to the first client device 620. Upon detecting the first client device 620 as being active on the network 610, or upon receiving the request from the first client device 620, the DHCP server commences a process of assigning a first socket IP address to the first client device 620. Generally, the first socket IP address uniquely identifies the first client device 620 within the network 610 while recycling IPv4 addresses that have been previously assigned to other devices, which are active on the network 610, such as the second client device 630. Accordingly, the limited address space associated with IPv4 addresses is expanded through incorporation of port ranges into data-packet headers.

The process of assigning the first socket IP address to the first client device 620, implemented by the DHCP server 650, may initially involve assigning to the first client device 620 an IPv4 address that has available ports associated therewith. As discussed previously, there are 65,536 ports associated with an IPv4 address. However, those ports that are well-known and/or reserved for supporting common operations (e.g., port 21 for FTP, port 25 for SMTP, port 80 for HTTP, and other such ports) are typically excluded from being allocated to a particular client device and, thus, are not considered to be available ports. In addition, those ports associated with the IPv4 address that are currently or previously allocated to a client device on the network 610 are considered to be in use and are not available ports. By way of example, the DHCP server is configured to track and record the ports associated with the IPv4 address that are in use and to collect those remaining ports that are neither in use nor designated as well-known ports into the group of available ports that can be presently allocated to the first client device 620.

Once an IPv4 address associated with available ports is assigned to the first client device, a group of ports is selected from the available ports. In one instance, the selected group of ports is a range of ports of the available ports that is allocated to the first client device 620, where the IPv4 address and the allocated port range form the first socket IP address. However, although the phrase "range of ports" is used throughout, it should be understood and appreciated that any number of nonconsecutive ports may be allocated to a client device as part of the socket IP address. The functional-capabilities component 651, the network-traffic component 652, or a combination thereof may be employed to select a range of ports that is allocated to the first client device 620. Although two different components and methods for allocating ranges of ports will be described, it should be understood and appreciated that other types of suitable mechanisms that select available ports based on other criteria may be used, and that embodiments of the present invention are not limited to the functional-capabilities component 651 and the network-traffic component 652 described herein. For instance, ranges of ports may be selected based on a pattern of network usage associated with a particular customer or company that utilizes the network 610.

In an exemplary embodiment, the functional-capabilities component 651 generally allocates a range of ports to the first client device 620 and selects a size of the port range based on, or as a function of, functional capabilities of the first client device 620. The phrase "functional capabilities," as used herein, is not meant to be limiting, but may encompass any functionality that can be provided on a client device. By way of example, some functional capabilities that are contemplated by the present invention include sending and receiving emails, text and multimedia messages, registering contacts, accessing the Internet, playing online games, and taking and sharing photos and videos. These functional capabilities may be carried to the DHCP server 650 in the request for a network identifier from the first client device 620, or may be accessed at some memory location, such as a user profile 660, that is reachable by the functional-capabilities component 651. By way of example, an identity of the first client device 620 may be ascertained in the form of a MAC address upon the first client device 620 becoming active on the network 610. This ascertained MAC address may then be compared against the user profile 660 to discover the functional capabilities that are included within the first client device 620. In an exemplary embodiment, the functional-capabilities component 651 carries out the step of identifying the functional capabilities of the first client device 620 when the DHCP server 650 is authenticating the first client device 620 on the network 610.

The functional-capabilities component 651 may proceed to allocate a selection of the available ports associated with the IPv4 address utilizing the functional capabilities of the first client device 620. In one instance, the greater the number and/or the more complex the type of functional capabilities that are exhibited by the first client device 620, the greater the number of ports that will be awarded thereto (e.g., the larger the size of the range of ports). By way of example only, a low-end feature phone may be allocated 50 ports, which will adequately support the feature phone when operating at maximum capacity, while a high-end server may be allocated 1000 ports, which will adequately support the server when conducting high-bandwidth processing. Accordingly, this method of device-specific allocation relies on the assumption that different devices may require different amounts of ports to operate properly and, based on this assumption, the functional-capabilities component 651 individually selects ports for each device in order to fully expand the address space of each IPv4 address. In another instance, the functional-capabilities component 651 allocates a group of ports or a port range for assignment to a host that is consistent in composition (i.e., number and identity of ports) with groups of ports or port ranges that are allocated to similarly configured hosts.

In other embodiments, a default range of ports (e.g., 1000 ports, which supports operations of most devices regardless of their functional capabilities) is consistently allocated to each device on the network 610 from the available ports until a trigger-event is reached. In the case where the default range of ports is 1000 ports, about sixty-four devices may be granted a common IPv4 address while still being assigned distinct socket IP addresses. In some instances, the trigger-event may be a recognition that only a threshold number of available IPv4 addresses are left. In other instances, the trigger-event may be an arrival of a particular period of time during a day or a week that is recognized as having high network usage. Once the trigger-event occurs, the functional-capabilities component 651 may resume inspecting the functional capabilities of the client devices becoming active on the network 610 to determine a size of a range of ports to allocate to each of the active client devices, individually.

In an exemplary embodiment, the network-traffic component 652 generally allocates a range of ports to the first client device 620 and selects a size of the port range based on, or as a function of, an amount of traffic presently or previously occupying the network 610. As used herein, the phrase "network traffic" is not limited to current usage of the network 610, but may represent a load on the network during any window or snapshot of time. By way of example, the load on the network 610 during a particular window of time may be a tracked number of network connections that are made between particular hours or days. This load on the network 610 may be averaged over a predetermined number of days, such as just weekdays, weekend days, non-holidays, and the like, in order to generate network traffic values that accurately predict how many client devices will likely be active on the network 610 at any time during any day. Or, the network traffic may represent a snapshot of network usage that is periodically taken and stored for future reference. By way of example, the snapshot may describe a number of client devices occupying the network at a particular point in time (e.g., at a time proximate to when the first client device 620 is requesting a network identifier from the DHCP server 650).

By tracking the network traffic, the network-traffic component 652 can broaden or narrow the size of the port range allocated to the first client device 620 from the available ports. However, dynamically adjusting the size of the port ranges for each client device may expend an additional amount of processing resources. Accordingly, the network-traffic component 652 may be invoked when one or more criteria is met, and may sit in an inactive state otherwise. For instance, the network-traffic component 652 may be invoked to broaden or narrow the sizes of the port ranges upon the volume of network traffic in the network 610 exceeding a predetermined level. Further, the network-traffic component 652 may be returned to the inactive state upon the volume of network traffic in the network 610 falling below the predetermined level or meeting other criteria.

Once the DHCP server 650 assigns the first client device 620 the IPv4 address and allocates a range of ports thereto (e.g., utilizing one or more of the components 651 and 652), the resultant socket IP address is communicated to the first client device 620 and, potentially, stored at the ARP table 645 and/or at another memory location that is accessible to the DHCP server 650 or to the computing device 640. When attempting to communicate across the network 610, the first client device 620 may insert the socket IP address into a header of IPv4 data packets that are transmitted therefrom. The socket IP address within the header allows the computing device 640, via the ARP table 645, to identify the sender of the IPv4 data packets as the first client device 620. In addition, the computing device 640 is capable of routing IPv4 data packets 655 to the first client device 620 upon another client device, such as the second client device 630, populating the header of the IPv4 data packets 655 with the socket IP address assigned to the first client device 620. By way of example, the computing device 640 represents a last router in a hub structure of the network 610 that inspects the port range of the socket IP address to properly route the IPv4 data packets 655 to the first client device 620.

Figures 7, 8:
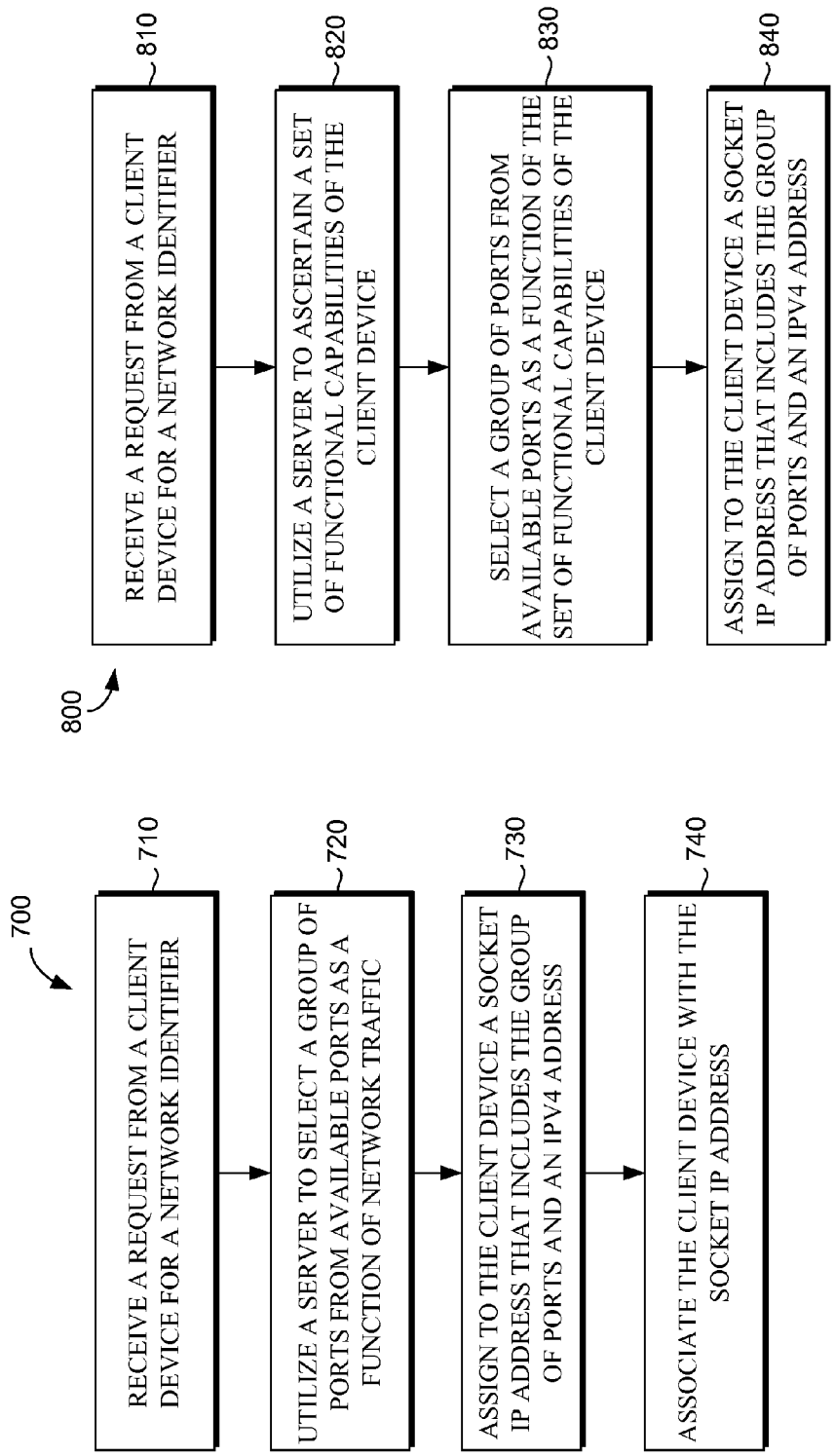
FIG. 7 is a flow chart of an exemplary method for allocating a group of ports from available ports as a function of network traffic, according to an embodiment of the present invention.
FIG. 8 is a flow chart of an exemplary method for allocating a group of ports from available ports as a function of a set of functional capabilities of a client device, according to an embodiment of the present invention.

With reference to FIG. 7, a flow chart is illustrated that shows an exemplary method 700 for allocating a group of ports from available ports as a function of network traffic, according to an embodiment of the present invention. As depicted at block 710, a request from a first client device for a network identifier is received. A server, such as the DHCP server 650 of FIG. 6, is used to select a first group of ports from available ports based on, or as a function of, network traffic. This is depicted at block 720. As discussed above, in embodiments, the network traffic may represent a history of network usage during a relevant window of time, or a snapshot of a load on the network (e.g., a quantity or nature of client devices occupying or connected through the network). As depicted at block 730, the first client device is assigned a first socket IP address that includes the first group of ports and an IPv4 address, where the first group of ports are selected from the available ports that are associated with the IPv4 address. The first client device may be associated with the first socket IP address, as depicted at block 740. In embodiments, this association may be stored at a memory location, such as the ARP table 645 of FIG. 6, or may be communicated to one or more devices, such as the first client device 620 of FIG. 6. In embodiments, the first socket IP address may be leased to the first client device for a predefined amount of time (e.g., persisted in a cache across active sessions on the network), or may be dynamically recalculated every time the first client device submits a request for an network identifier.

The method 700 may also involve selecting a second group of ports from the available ports as a function of the network traffic and assigning to a second client device a second socket IP address that includes the second group of ports. The second socket IP address may further include the same IPv4 address assigned to the first client device at block 730. Generally, the first group of ports and the second group of ports do not share a common port. Accordingly, the first socket IP address uniquely identifies the first client device in the context of the network, while the second socket IP address uniquely identifies the second client device in the context of the network.

Turning to FIG. 8, a flow chart illustrating an exemplary method 800 for allocating a group of ports from available ports as a function of a set of functional capabilities of a client device is shown, according to an embodiment of the present invention. In one instance, the method 800 involves the steps of receiving a request from a first client device for the network identifier, and utilizing a server to ascertain functional capabilities of the first client device, as depicted at blocks 810 and 820 respectively. As discussed above, the number and the type of functional capabilities exhibited by client devices joined to the network may vary drastically therebetween. Accordingly, the size of the group of ports allocated to the client devices may also vary in concert with the number and the type of functional capabilities exhibited by each.

As depicted at block 830, a first group of ports is selected from available ports based on, or as a function of, the number and the type of the functional capabilities of the first client device. The server then assigns to the first client device a first socket IP address that includes the first group of ports and an IPv4 address, as depicted at block 840. Because this distinct number of ports is allocated to, or reserved for, the first client device, the first socket IP address assigned to the first client device is different from a second socket IP address assigned to a second client device even when the client devices share a common IPv4 address. Accordingly, an individual IPv4 address can be expanded to uniquely identify, within the context of the network, multiple client devices.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A computer system for assigning network identifiers to client devices in a network, the system comprising:
 a first client device that includes a first set of functional capabilities;
 a second client device that includes a second set of functional capabilities; and
 a dynamic host configuration protocol (DHCP) server that allocates a first socket IP address including an IPv4 address and a first group of ports and that allocates a second socket IP address including the IPv4 address and a second group of ports,
 wherein the DHCP server assigns the first socket IP address to the first client device and the second socket IP address to the second client device,
 wherein the DHCP server temporarily stores at an address resolution protocol (ARP) table the first socket IP address in association with the first client device and the second socket IP address in association with the second client device, wherein a number of ports within the first group of ports is a function of either network traffic or the first set of functional capabilities exhibited by the first client device, and wherein a number of ports within the second group of ports is a function of either the network traffic or the second set of functional capabilities exhibited by the second client device.

2. The computer system of claim 1, wherein the first client device incorporates the first socket IP address within a header of a first IPv4 data packet and transmits the first IPv4 data packet over the network, and wherein the first client device is identified as the sender of the first IPv4 data packet based on the first socket IP address carried therein.

3. The computer system of claim 1, wherein the second client device incorporates the second socket IP address within a header of a second IPv4 data packet and transmits the second IPv4 data packet over the network, and wherein the second client device is identified as the sender of the second IPv4 data packet based on the second socket IP address carried therein.

4. The computer system of claim 1, wherein the first IPv4 data packet and the second IPv4 data packet are transmitted to a first destination and a second destination, respectively, based, in part, on information within the ARP table.

5. The computer system of claim 1, wherein the DHCP server assigns the first socket IP address to the first client device and the second socket IP address to the second client device upon detecting that the first client device and the second client device are active in a wireless network that supports communication via IPv4 data packets.

6. The computer system of claim 5, wherein the first client device and the second client device request a network identifier from the DHCP server upon becoming active within the wireless network.

7. The computer system of claim 6, wherein the DHCP server, upon receiving the request from the first client device for the network identifier, assigns the first socket IP address to the first client device when authenticating the first client device on the wireless network.

8. The computer system of claim 6, wherein the DHCP server, upon receiving the request from the second client device for the network identifier, assigns the second socket IP address to the second client device as a function of a user profile associated with the second client device, and wherein the user profile includes an indication of the second set of functional capabilities included in the second client device.

9. A computerized method for assigning network identifiers to client devices in a network, the method comprising:

receiving a request from a first client device for a network identifier;

utilizing a dynamic host configuration protocol (DHCP) server to select a first group of ports from available ports as a function of network traffic, wherein a port range encompassed within the first group of ports varies dynamically based on, in part, network traffic;

assigning to the first client device a first socket IP address that includes the first group of ports and an IPv4 address; and associating the first client device with the first socket IP address.

10. The computerized method of claim 9, further comprising:

receiving a request from a second client device for a network identifier;

utilizing the DHCP server to select a second group of ports from the available ports as a function of the network traffic, wherein a port range encompassed within the second group of ports varies dynamically based on, in part, network traffic;

assigning to the second client device a second socket IP address that includes the second group of ports and the IPv4 address; and associating the second client device with the second socket IP address.

11. The computerized method of claim 10, wherein the first group of ports and the second group of ports do not share a common port.

12. The computerized method of claim 10, wherein an IPv4 data packet with a header that includes the first socket IP address is routed to a first destination.

13. The computerized method of claim 10, wherein an IPv4 data packet with a header that includes the second socket IP address is routed to a second destination.

14. The computerized method of claim 10, wherein the network traffic is a load on the network during a particular window of time that is averaged over a predetermined number of days.

15. The computerized method of claim 10, wherein the network traffic is a current amount of usage of the network measured periodically.

16. A computerized method for assigning a network identifier to a client device in a network, the method comprising:

receiving a request from a first client device for the network identifier;

utilizing a dynamic host configuration protocol (DHCP) server to ascertain a first set of functional capabilities of the first client device;

selecting a first group of ports from available ports as a function of the first set of functional capabilities of the first client device; and assigning to the first client device a first socket IP address that includes the first group of ports and an IPv4 address.

17. The computerized method of claim 16, further comprising:

receiving a request from a second client device for a network identifier;

utilizing the DHCP server to ascertain a second set of functional capabilities of the second client device;

selecting a second group of ports from the available ports as a function of the second set of functional capabilities of the second client device; and assigning to the second client device a second socket IP address that includes the second group of ports and the IPv4 address.

18. The computerized method of claim 17, wherein an IPv4 data packet with a header that includes the first socket IP address is routed to a first destination and an IPv4 data packet with a header that includes the second socket IP address is routed to a second destination.

19. The computerized method of claim 18, further comprising:

removing from the available ports the first and the second group of ports; and excluding from the available ports a group of ports that are pre-designated as supporting common operations.

* * * * *